(12) United States Patent
Cricri et al.

(10) Patent No.: US 10,776,631 B2
(45) Date of Patent: Sep. 15, 2020

(54) MONITORING

(71) Applicant: Nokia Technologies Oy, Espoo (FI)

(72) Inventors: Francesco Cricri, Tampere (FI); Jukka Saarinen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/741,571

(22) PCT Filed: Jul. 5, 2016

(86) PCT No.: PCT/FI2016/050492
§ 371 (c)(1),
(2) Date: Jan. 3, 2018

(87) PCT Pub. No.: WO2017/005976
PCT Pub. Date: Jan. 12, 2017

(65) Prior Publication Data
US 2018/0197015 A1 Jul. 12, 2018

(30) Foreign Application Priority Data
Jul. 9, 2015 (EP) .................................... 15175986

(51) Int. Cl.
*G06K 9/00* (2006.01)
*G05D 1/00* (2006.01)
(Continued)

(52) U.S. Cl.
CPC ........ *G06K 9/00771* (2013.01); *B64C 39/024* (2013.01); *G05D 1/0094* (2013.01);
(Continued)

(58) Field of Classification Search
None
See application file for complete search history.

(56) References Cited

U.S. PATENT DOCUMENTS 7,564,348 B2 7/2009 Staton et al.
2003/0179140 A1 9/2003 Patterson et al.
(Continued)

FOREIGN PATENT DOCUMENTS

CN 102682627 A 9/2012
CN 103002729 A 3/2013
(Continued)

OTHER PUBLICATIONS

"Parrot AR.Drone 2.0 Elite Edition", Parrot, Retrieved on Dec. 22, 2017, Webpage available at : https://www.parrot.com/uk/drones/parrot-ardrone-20-elite-edition#parrot-ardrone-20-elite-edition.
(Continued)

*Primary Examiner* — Heather R Jones
(74) *Attorney, Agent, or Firm* — Harrington & Smith (57) ABSTRACT

A method comprising: recognizing a first two-handed gesture and a second two-handed gesture in a monitored scene space to at least partially define a shape and position of a computer-implemented virtual boundary in a corresponding monitoring space, wherein the first two-handed gesture in the monitored scene space specifies a first two points in the monitoring space and the second two-handed gesture in the monitored scene space specifies a second two points in the monitoring space; causing implementation of the computer-implemented virtual boundary in the monitoring space corresponding to the monitored scene space, wherein a shape and position of the computer-implemented virtual boundary is at least partially defined by the first two points in the monitoring space and the second two points in the monitoring space; and processing received data to generate a response event when there is a change in a portion of the monitored scene space relative to the computer-implemented virtual boundary in the corresponding monitoring space.

25 Claims, 6 Drawing Sheets

(51) Int. Cl.
  *G05D 1/10*    (2006.01)
  *G06K 9/20*    (2006.01)
  *B64C 39/02*   (2006.01)

(52) U.S. Cl.
  CPC ............. *G05D 1/101* (2013.01); *G05D 1/104* (2013.01); *G06K 9/0063* (2013.01); *G06K 9/00221* (2013.01); *G06K 9/00624* (2013.01); *G06K 9/00664* (2013.01); *G06K 9/2081* (2013.01); *B64C 2201/141* (2013.01)

(56) References Cited

U.S. PATENT DOCUMENTS

| | | | |
|---|---|---|---|
| 2006/0099969 | A1 | 5/2006 | Staton et al. |
| 2013/0180469 | A1 | 7/2013 | Gurley et al. |
| 2014/0249693 | A1* | 9/2014 | Stark .................. B64C 39/024 701/2 |
| 2014/0316616 | A1 | 10/2014 | Kugelmass |
| 2015/0120126 | A1* | 4/2015 | So ...................... G01C 23/00 701/26 |
| 2016/0266579 | A1* | 9/2016 | Chen .................. G05D 1/0038 |
| 2016/0328979 | A1* | 11/2016 | Postrel .............. B64C 39/024 |

FOREIGN PATENT DOCUMENTS

| | | |
|---|---|---|
| CN | 104156821 A | 11/2014 |
| CN | 104299365 A | 1/2015 |
| EP | 3037917 A1 | 6/2016 |
| EP | 3101511 A1 | 12/2016 |
| EP | 3101629 A1 | 12/2016 |
| EP | 3115870 A1 | 1/2017 |
| EP | 3115926 A1 | 1/2017 |
| EP | 3115978 A | 1/2017 |
| JP | 2002211494 A | 7/2002 |
| JP | 2004062611 A | 2/2004 |
| JP | 2004106802 A | 4/2004 |
| JP | 2006281830 A | 10/2006 |
| JP | 2007099197 A | 4/2007 |
| JP | 2008068710 A | 3/2008 |
| JP | 2010132073 A | 6/2010 |

OTHER PUBLICATIONS

"Drones That Can See in Augmented Reality", Motherboard, Retrieved on Dec. 22, 2017, Webpage available at : https://motherboard.vice.com/en_us/article/pga4dv/drones-that-can-see-in-augmented-reality.

Extended European Search Report received for corresponding European Patent Application No. 15175986.7, dated Mar. 30, 2016, 7 pages.

International Search Report and Written Opinion received for corresponding Patent Cooperation Treaty Application No. PCT/FI2016/050492, dated Oct. 6, 2016, 10 pages.

Apr. 5, 2019 (KR) Korean Office Action—Application No. 2018-7004089.

Office action received for corresponding Japanese Patent Application No. 2018-500389, dated Jan. 9, 2019, 7 pages of office action and 5 pages of translation available.

Office action received for corresponding Chinese Patent Application No. 201680040223.8, dated Jan. 28, 2019, 7 pages of office action and no page of translation available.

Office action received for corresponding Japanese Patent Application No. 2018-500389, dated Feb. 27, 2019, 7 pages of office action and 4 pages of translation available.

Arai, "For Agricultural Use, The Drones Fly", Ikaros Publications Ltd., vol. 9, May 25, 2015, 7 pages.

Hinata, "Open of the International Drone Exposition—the Foreign Power Take it by Storm", Toho Press, vol. 41, Jun. 29, 2015, 3 pages.

Matsuo, "Can the Artificial Intelligence Overreach a Human?", Kadokawa Corporation, Mar. 10, 2015, 5 pages.

* cited by examiner

FIG. 9

MONITORING

RELATED APPLICATION

This application was originally filed as Patent Cooperation Treaty Application No. PCT/FI2016/050492 filed Jul. 5, 2016 which claims priority benefit to European Patent Application No. 15175986.7, filed Jul. 9, 2015.

TECHNOLOGICAL FIELD

Embodiments of the present invention relate to monitoring a scene. In particular, they relate to automated monitoring of a scene.

BACKGROUND

Current monitoring systems, such as surveillance systems, may comprise one or more cameras for video recording, with or without audio recording, connected via wires or wirelessly to a hub that stores or enables storage of the data recorded from the scene. An operator may, in some examples, be able to use the hub to program settings for the cameras and/or the hub.

BRIEF SUMMARY

According to various, but not necessarily all, examples of the disclosure there is provided a method as claimed in any of claims 1-14.

According to various, but not necessarily all, examples of the disclosure there is provided an apparatus as claimed in claim 14.

According to various, but not necessarily all, examples of the disclosure there is provided an apparatus comprising: at least one processor; and
  at least one memory including computer program code
  the at least one memory and the computer program code configured to, with the at least one processor, cause the apparatus at least to perform a method as claimed in any of claims 1-14.

According to various, but not necessarily all, examples of the disclosure there is provided computer program code that, when performed by at least one processor, causes a method of at least one of claims 1-14 to be performed.

According to various, but not necessarily all, examples of the disclosure there is provided a computer program that, when run on a computer, performs: a method as claimed in any of claims 1-14.

According to various, but not necessarily all, examples of the disclosure there is provided a method comprising: positioning a first movable craft in a monitored scene space to at least partially define a shape and position of a computer-implemented virtual boundary in a corresponding monitoring space; causing implementation of the computer-implemented virtual boundary in the monitoring space corresponding to the monitored scene space; processing received data from sensors of the monitored scene space to enable generation of a response event in response to a change in at least a portion of the monitored scene space relative to the computer-implemented virtual boundary in the corresponding monitoring space; recognizing a handover from the first movable craft to a second movable craft; positioning the second movable craft in the monitored scene space to at least partially define a new computer-implemented virtual boundary in the corresponding monitoring space; and processing received data from sensors of the monitored scene space to enable generation of a response event in response to a change in at least a portion of the monitored scene space relative to the new computer-implemented virtual boundary in the corresponding monitoring space.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DEFINITIONS

In this document the term "maneuver" when used as a noun in relation to one movable craft refers to a change in position of the movable craft over time and when used as a noun in relation to multiple movable craft relates to their relative positions at a moment in time or to a change in the positions or relative positions of one or more of the movable craft over time. If one considers that a set of space co-ordinates define a position at a particular time, a maneuver is defined by multiple different sets of space coordinates for one or more movable craft that define different positions in space. The term "maneuver" when used as a verb or adjective refers to the performance of a maneuver.

In this document a "movable craft" is a conveyance, vehicle or other means of transport. In this document a "monitored scene space" or "scene space" or "scene" is a three dimensional space that is monitored.

In this document a "monitoring space" is a virtual three dimensional space that corresponds to the monitored scene space and within which a computer-implemented virtual boundary is defined.

In this document a "computer-implemented virtual boundary" is a boundary in the monitoring space, which is a computer-implemented virtual space.

In this document an "event" is an occurrence.

In this document a "response event" is an occurrence generated in response to a detected change in the monitored scene space.

DETAILED DESCRIPTION

The system 100 described is a system that monitors at least one scene 140. A scene 140 is a space where an event may occur. The scene 140 may consequentially also be referred to as a monitored scene space 140. The operation of the system 100 can be controlled by one or more movable craft that maneuver within the monitored scene space 140. For example, one or more movable craft can define at least one computer-implemented virtual boundary 144 to be monitored by the system 100.

Figure 1:
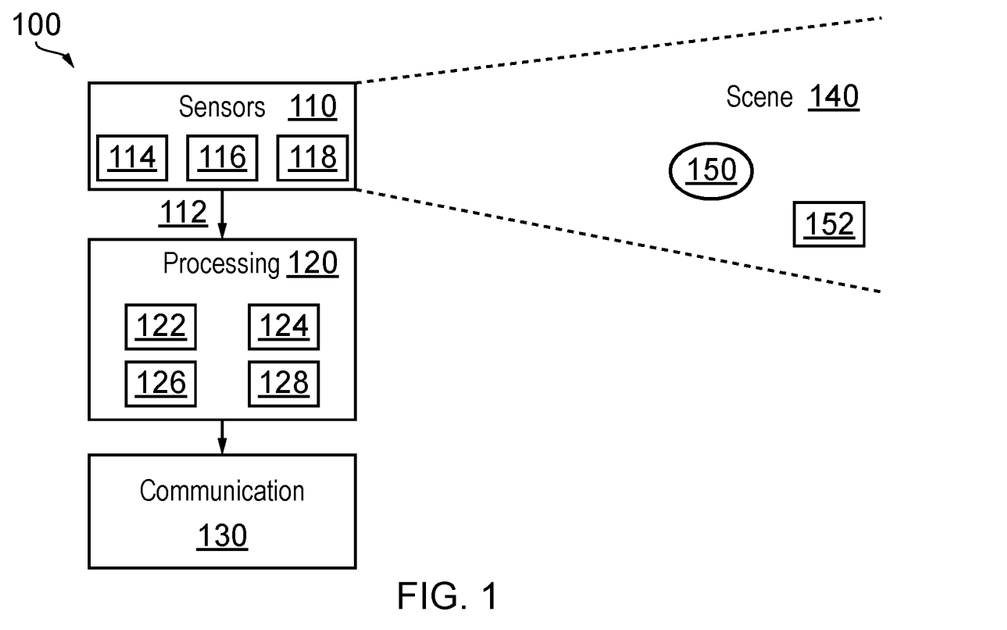
FIG. 1 schematically illustrates an example of a system.

FIG. 1 schematically illustrates a system 100 comprising: one or more sensors 110 configured to record sensor data 112 from a scene 140; a processing module 120 configured to process the sensor data 112 recorded from the scene 140 to recognize automatically events that occur in the scene 140 and to automatically take decisions as a consequence of the recognition; and a communication module 130 configured to communicate, when a decision to communicate is taken by the processing module 120.

Some but not necessarily all of the events that are recognized may relate to an object 152 or a particular object 152 in the scene 140. An object may be an inanimate object, an animal, a person or a particular person in the scene 140. In some but not necessarily all examples of the system 100, the system 100 is a real-time recognition system and the automatic recognition and decision, if any, occur substantially at the same time as the sensor data 112 is recorded.

The system 100 may enable a user to control monitoring, for example, from within the scene 140. The system 100 may enable a user to control recognition and/or a consequence of recognition, for example, via motion of the user or other controlling object 150 within the scene. The controlling object 150 may be part of a person in the scene 140 or an object carried by a person or may be a movable craft 200 within the scene 140.

Examples of actions performed may be the generation of an alert or notification.

In some but not necessarily all examples, the system 100 may comprise a number of discrete apparatus. For example, the sensors 110 may be housed in one or more separate apparatus, the processing module 120 may be housed in one or more apparatus and the communication module 130 may be housed in one or more apparatus. Where a component or components of the system 100 are housed in discrete apparatus, those apparatus may be local or remote to each other and, where they are remote they may communicate, for example, over a network.

In some but not necessarily all examples, the system 100 may be housed in a single apparatus.

The sensors 110 are configured to record or enable recording of sensor data 112 from the scene 140.

A scene 140 may comprise static components that have, for example, fixed relative positions, such as for example static objects. These static objects have different static positions in the scene's three-dimensional space (scene space). A scene 140 may comprise moving components, such as for example a moving object. A moving object has different positions in the scene space over time. Reference to 'the scene' in relation to different sensor data 112 or different times implies a continuity of those static components of the scene 140 that are sensed, it does not necessarily imply a continuity of some or all of the dynamic components although this may occur.

The recording of sensor data 112 may comprise only temporary recording, or it may comprise permanent recording or it may comprise both temporary recording and permanent recording. Temporary recording implies the recording of data temporarily. This may, for example, occur during sensing, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The sensors 110 may be configured to transduce propagating waves, such as sound waves and/or light waves, to electrical signals encoding the propagating wave data from the scene 140 as sensor data 112.

In some but not necessarily all examples, one or more of the sensors 110 are fixed in space relative to the scene space 140. In other examples, which may be the same or different examples, one or more of the sensors 110 are movable or moving relative to the scene space 140. For example, one or more of the sensors 110 may be part of some, all or none of the one or more movable craft 200.

In some, but not necessarily all embodiments, the sensors 110 are or comprise image sensors 114. An example of an image sensor 114 is a digital image sensor that is configured to operate as a camera. Such a camera may be operated to record static images and/or video images.

In some, but not necessarily all embodiments, cameras may be configured in a stereoscopic or other spatially distributed arrangement so that the scene 140 is viewed from different perspectives. This may enable the creation of a three-dimensional image and/or processing to establish depth, for example, via the parallax effect.

In some, but not necessarily all embodiments, the sensors 110 are or comprise audio sensors 116. An example of an audio sensor 116 is a microphone or microphones. Microphones may be configured in a stereoscopic or other spatially distributed arrangement such as a microphone array so that the scene 140 is sampled from different perspectives. This may enable three-dimensional spatial audio processing, that allows positioning of audio within the scene 140.

In some, but not necessarily all embodiments, the sensors are or comprise depth sensors 118. A depth sensor 118 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the scene 140 with light, preferably invisible light such as infrared light, with a spatially dependent pattern. Detection of a certain pattern by the receiver allows the scene 140 to be spatially resolved. The distance to the spatially resolved portion of the scene 140 may be determined by time of flight and/or stereoscopy (if the receiver is in a stereoscopic position relative to the transmitter).

In these 'passive' or 'non-active' examples of depth sensing are passive and merely reflect incident light or sound waves emitted by a transmitter. However, 'active' examples, which require activity at the sensed object, may additionally or alternatively be used.

In the illustrated example, but not necessarily all examples, the processing module 120 comprises a memory sub-module 122, a processing sub-module 124, a recognition sub-module 126, and a control sub-module 128. While the 'modules' are described and illustrated separately they may be, although they need not be, separate or combined in different combinations. For example, the processing sub-module 124, the recognition sub-module 126, and the control sub-module 128 may be performed by the same circuitry or under the control of the same computer program. Alternatively one or more of the processing sub-module 124, the recognition sub-module 126, and the control sub-module 128 may be performed by dedicated circuitry or a dedicated computer program. The sub-modules may be performed using software, dedicated hardware or a mix of programmed hardware and software.

The memory sub-module 122 may be used to store unprocessed sensor data and/or processed sensor data 112 (scene data), computer programs, scene space models and other data used by the processing module 120, although other sub-modules may have their own memories.

The processing sub-module 124 may be configured to process the sensor data 112 to determine scene data that is meaningful about the scene 140.

The processing sub-module 124 may be configured to perform image processing where the sensor data 110 comprises image data from a camera or cameras 114. The processing sub-module 124 may be configured to perform audio processing where the sensor data 110 comprises audio data from a microphone or microphones 116.

The processing sub-module 124 may be configured to perform automatically one or more of the following tasks using the sensor data 112 to create scene data that has potential meaning for the scene 140:

use machine (computer) vision to perform one or more of:
detect a (moving or stationary) object or person,
classify a (moving or stationary) object or person, and/or
track a (moving or stationary) object or person;
use spatial analysis to perform one or more of:
position a (moving or stationary) object in the scene space using depth determination; and/or
create a map of the scene space; and/or
use behavior analysis to describe an event that occurs in the scene 140 as a potentially meaningful symbol.

An example of image processing is 'histogram of gradient features' analysis which creates a distribution of intensity gradients or edge directions for an image. The image may be divided into small connected regions (cells), and for each cell, a histogram of gradient directions or edge orientations is created for the pixels within the cell. The combination of these histograms then represents a descriptor.

An example of audio processing is 'mel-frequency cepstral coefficients' determination, spatial audio processing using, for example, audio beamforming techniques, audio event recognition or classification, speaker recognition or verification or speech recognition.

Motion detection may be achieved, for example, using differencing with respect to a background model (background subtraction) or with respect to a preceding image (temporal differencing), or using some other approach such as optical flow analysis using a vector-based approach.

Object classification may be achieved, for example, using shape-based analysis and/or motion-based analysis.

Classification of a person may be classification that an object is human or classification that an object is a particular human (identification). Identification may be achieved using an attribute or a combination of attributes that uniquely identifies a person within the set of possible persons. Examples of attributes include: biometric features that are or may be particular to a person such as their face or their voice: their shape and size; their behavior.

Object tracking may be achieved by labeling objects and recording the position in the scene 140 of the labeled object. The algorithm may need to deal with one or more of the following events: object entrance to the scene 140; object exit from the scene 140; object re-entrance to the scene 140; object occlusion; object merge. How to deal with these events is known in the art.

Object tracking may be used to determine when an object or person changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The system may track a plurality of objects and/or points in relation to a person's body, for example one or more joints of the person's body. In some examples, the system 100 may perform full body skeletal tracking of a person's body.

The tracking of one or more objects and/or points in relation to a person's body may be used by the system 100 in gesture recognition and so on.

Behavior analysis requires describing an event that occurs in the scene 140 using a meaningful symbology. An event may be something that occurs at a spatio-temporal instance or it may be a spatio-temporal sequence (a pattern of spatio-temporal instances over time). An event may relate to motion of an object (or person) or interaction of a person and object.

In some, but not necessarily all implementations, an event may be represented by a putative symbol defined in terms of parameters determined from the machine (computer) vision analysis and/or the spatial analysis. These parameters encode some or more of what is happening, where it is happening, when it is happening and who is doing it.

The recognition sub-module 126 is configured to recognize a putative symbol encoding an event in the scene 140 as a meaningful symbol associated with a particular meaning.

The recognition sub-module 126 may be configured to recognize a putative symbol, defined in terms of parameters determined from the machine (computer) vision analysis and/or the spatial analysis, and produced by the processing sub-module 124 as having meaning. The recognition sub-module 126 may, for example, store or access a database of meaningful reference symbols and may use a similarity test to determine whether a putative symbol is 'similar' to a meaningful symbol.

The recognition sub-module 126 may be configured as a machine (computer) inference engine or other recognition engine such as an artificial neural network or clustering in the parameter space. The recognition sub-module may 126, in some examples, be trained, via supervised learning, to recognize meaningful symbols as similar to reference symbols.

The control sub-module 128 responds to the determination that a meaningful event has occurred in the scene 140 in dependence on the event:

a) If the putative symbol is similar to a response symbol, the meaningful event is a 'response' event, and the control sub-module 126 performs a response action.

In some but not necessarily all examples the action performed may be programmed by a user. In some but not necessarily all examples the programming may occur via motion of the user or other controlling object 150 within the scene. Examples of actions performed may be the generation of an alert or notification.

The alert or notification may be provided via the communications module 130. The communications module 130 may communicate wirelessly, for example via radio waves or via a wired connection to a local or remote apparatus. Examples of such apparatus include but are not limited to displays, televisions, audio output apparatus, personal devices such as mobile telephone or personal computers, a projector or other user output apparatus.

In some but not necessarily all examples the response symbol may be programmed by a user. For example, a user may be able to program or teach a meaningful event that is represented by a meaningful response symbol. The response symbol, created by the user, may be added to the database of reference symbols or otherwise used to recognize a putative symbol as a meaningful symbol. In some but not necessarily all examples the programming may occur via motion of the user within the scene 140. Examples of meaningful events that are represented by meaningful symbols include particular actions or movements performed such as user input gestures.

Action by a single person or collective action by many people may be used as a response symbol. In some but not necessarily all examples, a particular gesture user input or collection of gesture user inputs may be used a response symbol.

b) If the putative symbol is similar to a control symbol, the meaningful event is a 'control' event, and the control sub-module 126 enables control of monitoring and/or control of the response.

For example, a user may be able to program or teach a meaningful response symbol that is added to the database of reference symbols. In some but not necessarily all examples the programming may occur via motion of a controlling object 150, for example a user or movable craft, within the scene 140.

For example, a user may be able to program or teach an action performed when the putative symbol is matched to a response symbol. Examples of actions performed may be the generation of an alert or notification.

Figure 2:
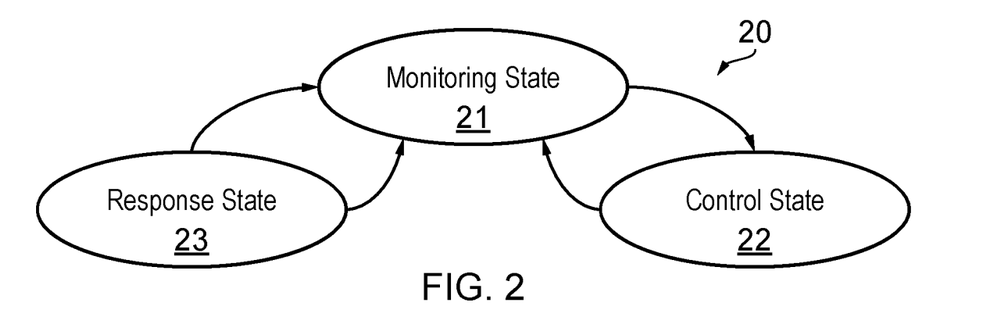
FIG. 2 illustrates an example of a state machine.

The operation of the processing module 120 may be further understood from FIG. 2 which illustrates a state machine 20 for the processing module 120. The state machine 20 has a monitoring state 21, a control state 22 and an automatic response state 23.

In the monitoring state 21, the sensors 110 provide sensor data 112, and the processing sub-module 124 automatically processes the sensor data 112 (video and/or audio and/or depth) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140, the control sub-module 126 responds automatically depending on the event. If the meaningful event is a 'response' event, then the state machine 20 transitions to the response state 23 and the control sub-module 126 performs a response action. The response action may be associated with the response event. If the event is a 'control' event, then the state machine 20 transitions to the control state 22 and control of monitoring and/or response is enabled. The enablement may be in a manner associated with that control state 22.

Action by a single person or collective action by many people may be used as a 'control' symbol. In some but not necessarily all examples, a particular gesture user input may be used a control symbol.

In some examples, the system 100 may track one or more objects and/or points in relation to a person's body in gesture recognition. For example, the system 100 may perform full skeletal tracking of a person's body in gesture recognition.

Implementation of the processor module 120 or part of the processor module 120 may be as controller circuitry. The controller circuitry 120 may be implemented in hardware alone, have certain aspects in software including firmware alone or can be a combination of hardware and software (including firmware).

Figure 3:
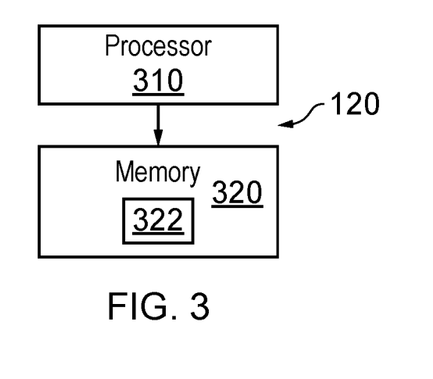
FIG. 3 illustrates an example of a processing module.

As illustrated in FIG. 3 the controller 120 may be implemented using instructions that enable hardware functionality, for example, by using executable computer program instructions 322 in a general-purpose or special-purpose processor 310 that may be stored on a computer readable storage medium (disk, memory etc) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 322 comprising computer program instructions (computer program code) that controls the operation of the processing module 120 when loaded into the processor 310. The computer program instructions, of the computer program 322, provide the logic and routines that enables the processing module to perform the methods discussed with reference to the Figs. The processor 310 by reading the memory 320 is able to load and execute the computer program 322.

The system 100 may therefore comprise an apparatus 120 that comprises:

at least one processor 310; and at least one memory 320 including computer program code 322 the at least one memory 320 and the computer program code 322 configured to, with the at least one processor 310, cause the apparatus 120 at least to perform one or more of blocks 124, 126, 128 of FIG. 1 and/or one or more of the blocks of FIG. 8.

Figure 4:
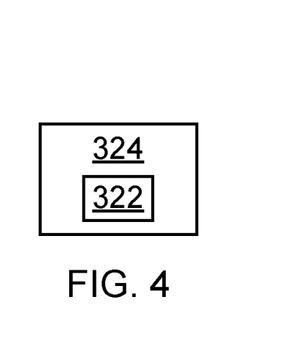
FIG. 4 illustrates an example of a delivery mechanism for a computer program.

As illustrated in FIG. 4, the computer program 322 may arrive at such an apparatus via any suitable delivery mechanism 324. The delivery mechanism 324 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 322. The delivery mechanism may be a signal configured to reliably transfer the computer program 322 such as a modulated electromagnetic wave or digitally encoded electrical signal. The apparatus 120 may propagate or transmit the computer program 322 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 9:
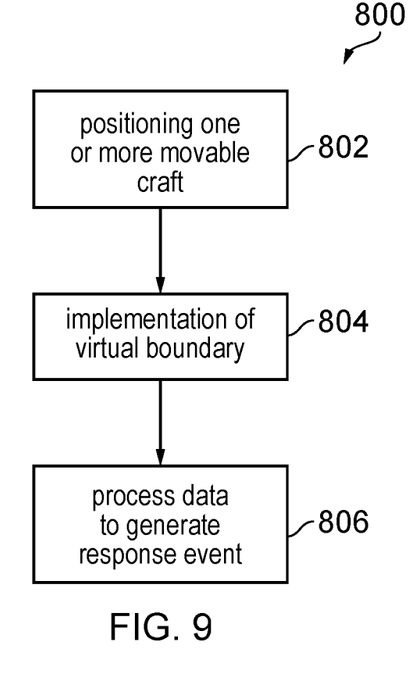
FIG. 9 illustrates an example of a method.

The blocks 124, 126, 128 illustrated in the FIG. 1 and/or the blocks illustrated in FIG. 9 may represent steps in a method and/or sections of code in the computer program 322. The illustration of a particular order to the blocks does not necessarily imply that there is a required or preferred order for the blocks and the order and arrangement of the block may be varied. Furthermore, it may be possible for some blocks to be omitted.

In some but not necessarily all examples the controlling object 150 may be a user, for example, a person 150 in the scene 140. In some but not necessarily all examples, which may be the same or different examples, the controlling object 150 may be one or more movable craft 200. In some but not necessarily all examples, the movable craft 200 may be an aircraft. One example of a movable craft 200 is a 'drone'. A drone Is a pilotless radio-controlled craft. An aircraft drone Is a pilotless radio-controlled aircraft.

Figure 5:
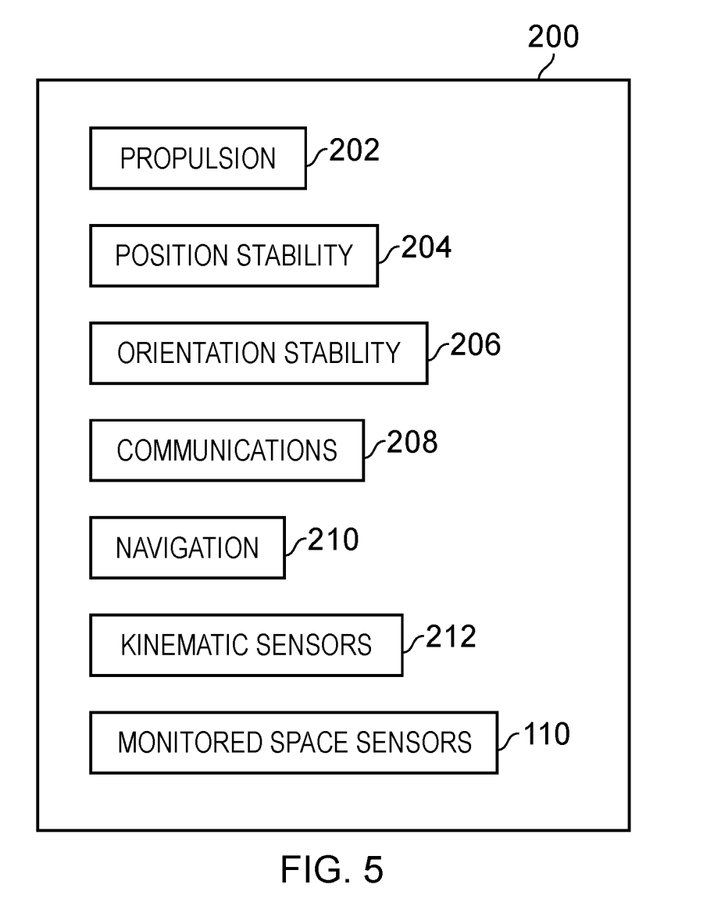
FIG. 5 illustrates an example of a movable craft.

FIG. 5 illustrates an example of a drone 200. In this example, but not necessarily all examples, the drone is an aircraft drone. The aircraft drone 200 comprises a propulsion system 202 for moving the aircraft drone 200 in three dimensions.

The positioning or re-positioning of the aircraft drone may be performed by a user manually or via voice control, semi-autonomously or autonomously. The position of the aircraft drone 200 may in some examples be defined by position only, in other examples by orientation only and in other examples by both position and orientation. Thus in some but not necessarily all examples, the aircraft drone may, be autonomous, semi-autonomous or entirely user-controlled at changing its three dimensional position and/or a three-dimensional orientation.

The term 'fully-autonomous' when used to describe a function means that the craft can perform the function according to pre-defined rules without the need for any real-time user input. The real-time control is entirely rule-based.

The term 'semi-autonomous' when used to describe a function means that the craft can perform the function according to pre-defined rules but additionally requires some real-time user input. The real-time control is not entirely rule-based and not entirely under the control of a user.

The term 'autonomous' encompasses both 'fully-autonomous' and "semi-autonomous'. Where a feature is described as 'autonomous' it may be 'fully-autonomous' or "semi-autonomous'.

The aircraft drone 200 may optionally comprise an autonomous position stability system 204. The autonomous position stability system 204 controls the propulsion system 202 to maintain the aircraft drone 200 at a particular three dimensional position. The maintained three dimensional position may, for example, be an absolute position defined in a co-ordinate system fixed to the earth or the maintained three dimensional position may, for example, be a relative position defined in a co-ordinate system that moves, for example with a tracked object 152 in the monitored scene space 140. The tracked object 152 may, for example, be another aircraft drone 200.

The aircraft drone 200 may optionally comprise an autonomous orientation stability system 206. The autonomous orientation stability system 206 controls the propulsion system 202 to maintain the aircraft drone 200 at a particular three dimensional orientation. The maintained three dimensional orientation may, for example, be an absolute orientation defined in a co-ordinate system fixed to the earth or the maintained three dimensional orientation may, for example, be a relative orientation defined in a co-ordinate system that moves, for example with a tracked object 152 in the monitored scene space 140. The tracked object 152 may, for example, be another aircraft drone 200.

The aircraft drone 200 may optionally comprise a wireless communications system 208 for communicating with a communications module 130 of the system 100.

The aircraft drone 200 may optionally comprise a navigation system 210 for enabling position of the aircraft drone 200 in three dimensions, for example, via satellite position or some other position technology. In some examples, a position of the aircraft drone 200 is communicated to the system 100. The navigation system 210 may also enable planning of a route followed by the aircraft drone 200 and/or provide an input to the position stability system 204 and/or the propulsion system 202

The aircraft drone 200 may optionally comprise kinematic sensors 212 for enabling detection of changes in position and/or orientation using, for example, an electronic compass, gyroscopes, magnetometers and accelerometers along different axes. These kinematic sensors 212 may provide input to the position stability system 204 and/or the orientation stability system 206.

The aircraft drone 200 may optionally comprise at least some of the sensors 110 configured to monitor the monitored scene space 140. The sensors 110 are configured to record or enable recording of sensor data 112 from the scene 140.

The aircraft drone 200 may be configured to operate outdoors. For example, the aircraft drone 200 may be configured to operate in wind and rain. The aircraft drone may be waterproofed.

The aircraft drone 200 may, for example, be used to define a computer-implemented virtual boundary outdoors, over a large area of tens, hundreds or thousands of meters and/or extending to a high altitude. This may be particularly useful at large scale outdoor events such as concerts, festivals, sports events, areas where crowd control is required or areas where surveillance is required.

Figure 6:
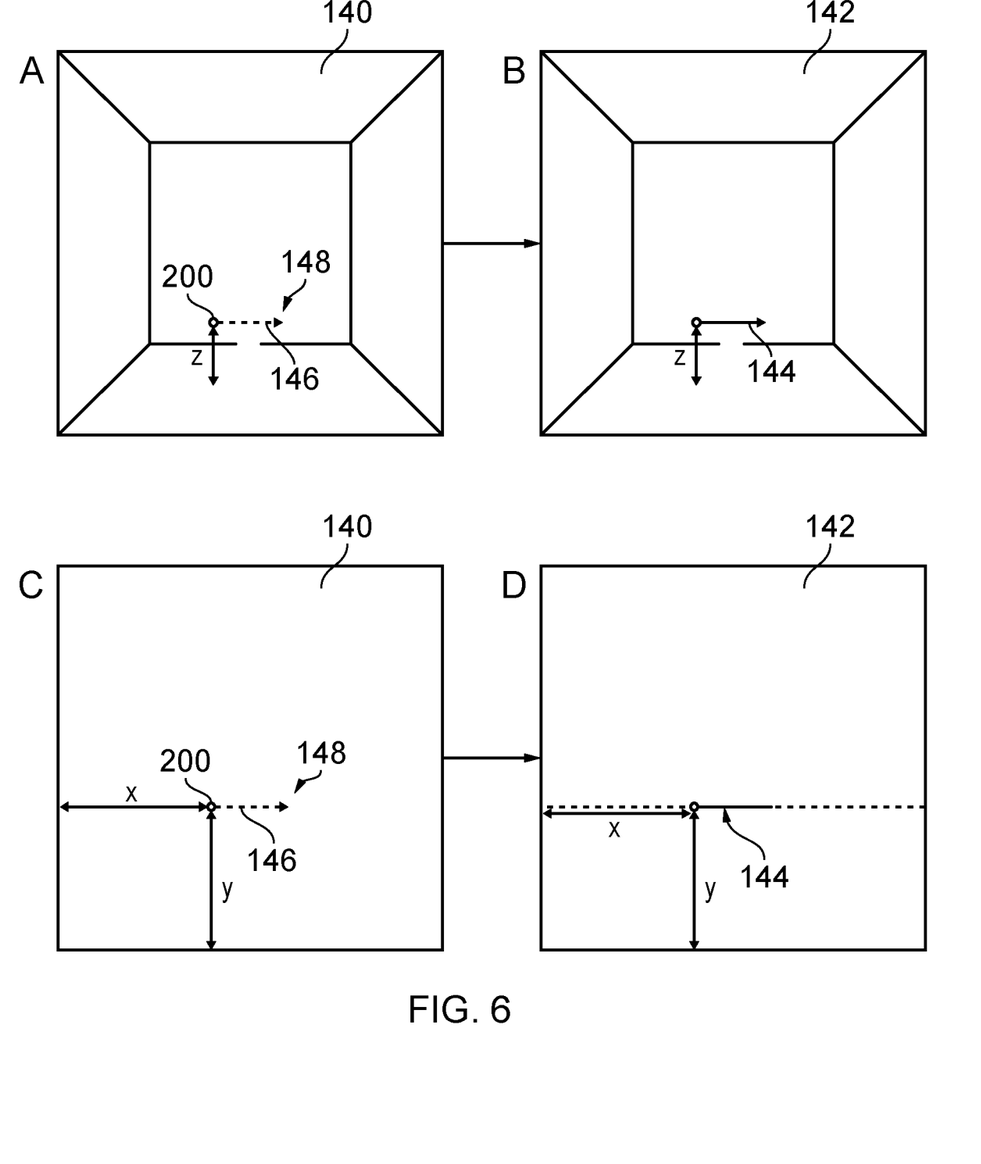
FIGS. 6A-D illustrate operation of the system.

FIG. 6 illustrates an example of operation of the system 100. Part A illustrates real-world scene within a three-dimensional space monitored by the system 100. The scene 140 may also be referred to as a monitored scene space 140.

In the example of FIG. 6 a movable craft 200, for example an aircraft drone, is performing a maneuver 146 to define at least one computer-implemented virtual boundary 144.

In the illustrated example the movable craft 200 is performing a maneuver to define a single computer-implemented virtual boundary 144. The maneuver 148 comprise any motion or series of motions in one spatial dimension, two spatial dimensions or three spatial dimensions and may take any form.

Part C of the example of FIG. 6 illustrates an overhead view of the monitored scene space 140 in which the movable craft 200 is illustrated making the maneuver 146 to define the computer-implemented virtual boundary 144.

As can be seen in parts A and C of the example of FIG. 6, the maneuver 146 has a position having Cartesian orthogonal coordinates $(x_i(t), y_i(t), z_i(t))$ in the scene 140 for each user input object i, at time t. In this example, $x_i(t)$ is measured from the left, $y_i(t)$ is measured from the front and $z_i(t)$ is measured from the bottom. It will be understood that other coordinate systems may be used and that different orientations of the Cartesian coordinate system may be used For simplicity of illustration in FIG. 6, the maneuver 146 comprises motion of one movable craft 200 in one spatial dimension as the value of x changes and the values of y and z remain constant. In other examples the values of x, y and/or z may vary in any way with movement 148 from any starting position in the monitored scene space 140. Also multiple movable craft 200 may be used, for example, simultaneously.

Parts B and D of the example of FIG. 6 illustrate a monitoring space 142 that corresponds to the monitored scene space 140 (a corresponding monitoring space 142). The monitoring space 142 comprises a virtual representation of the monitored scene space 140 created and used by the system 100. The monitoring space 142 may be formed, for example, from data received by the sensors 110, such as received image data and/or depth data. Parts B and D illustrate respectively the same views as illustrated in parts A and C of FIG. 6.

In some examples the system 100 may use information of the geometry of the monitored scene space 140 to form the monitoring space 142. For example, the system 100 may use a three dimensional model of the monitored scene space 140 in the formation of the monitoring space 142. The three dimensional model of the monitored scene space 140 may be created by the system 100 and/or may be received by the system 100. Methods for creating a three dimensional model of the monitored scene space 140 are known in the art.

The system 100 may use the monitoring space 142 to monitor the scene space 140. For example, the system may use the monitoring space 142 to implement and monitor at least one computer-implemented virtual boundary 144.

As indicated by the arrows between parts A and B and parts C and D of FIG. 6 there is a correspondence between the monitoring space 142 and the monitored scene space 140. In some examples there may be a one to one mapping M between the monitoring space 142 and the monitored scene space 140.

In other examples there may be a scale invariant transformation between the monitored scene space 140 and the monitoring space 142.

The system 100 recognizes the maneuver 146 performed by the movable craft 200 and in response implements at least one computer-implemented virtual boundary 144 in the monitoring space 142.

In some examples, recognizing the maneuver 146 may comprise processing received data. In one example the received data may be image data that are analyzed to position the movable craft 200 using image processing. In another example the received data may comprise position data that positions the movable craft 200, which in some examples may be a position provided by a positioning system within the movable craft 200.

In examples, a shape and position of the computer-implemented virtual boundary 144 in the monitoring space is determined, at least partially, by the maneuver 146 in the monitored scene space 140 and the computer-implemented virtual boundary 144 is located in the monitoring space at a corresponding position equivalent to the position of the maneuver 146 in the monitored scene space 140.

It will therefore be understood that the system 100 enables positioning of one or more movable craft 200 in a monitored scene space 140 to at least partially define a shape and position of a computer-implemented virtual boundary 144 in a corresponding monitoring space 142; causing implementation of the computer-implemented virtual boundary 144 in the monitoring space 142 corresponding to the monitored scene space 140; and processing received data 112 from sensors 110 of the monitored scene space 140 to generate a response event in response to a change in at least a portion of the monitored scene space 140 relative to the computer-implemented virtual boundary 144 in the corresponding monitoring space 142.

FIGS. 7A, 7B, 7C, 8A, 8B, 8C illustrate different examples of different positions of one or more movable craft 200 in a monitored scene space 140 that define 210 a shape and position of a computer-implemented virtual boundary 144 in a corresponding monitoring space 142.

In some but not necessarily all examples it may be necessary for a movable craft 200 to 'pair' with the system 100 to enable that movable craft 200 to control a shape and position of a computer-implemented virtual boundary 144. The pairing may for example comprise an authentication procedure that identifies the movable craft 200 and/or an authorization procedure that checks one or more security credentials.

In these figures, a point $p_n(t_x)$ refers to a point 214 in the monitored space 140 at a time $t_x$ and defined by a movable craft n. A point $p_n(t_x)$ corresponds to a particular point $p_n'(t_x)$ 216 in the monitored scene space 140, where the same label n is used consistently in both spaces to label corresponding points 214, 216 and the label x is used consistently in both spaces to label the time of correspondence.

The maneuver 148 in the monitored scene space 140 specifies a set of different points $\{p_n(t_x)\}$ which map to a corresponding set of points $\{p_n'(t_x)\}$ in the monitoring space 142. The mapping M that maps the monitored scene space 140 to the monitoring space 142 also maps the set of different points $\{p_n(t_x)\}$ in the monitored scene space 140 to a corresponding set of different points $\{p_n'(t_x)\}$ in the monitoring space 142.

The set of different points $\{p_n'(t_x)\}$ in the monitoring space 142 defines a shape and position of the computer-implemented virtual boundary 144 in the corresponding monitoring space 142.

In the example illustrated, the computer-implemented virtual boundary 144 in the monitoring space passes through each of the points 216 in the set points $\{p_n'(t_x)\}$ In the examples illustrated, the computer-implemented virtual boundary 144 is an N-sided polygon having a vertex (angular point) at each of the points 216 in the set points $\{p_n'(t_x)\}$.

The computer-implemented virtual boundary 144 may be one, two or three dimensional.

Figure 7A:
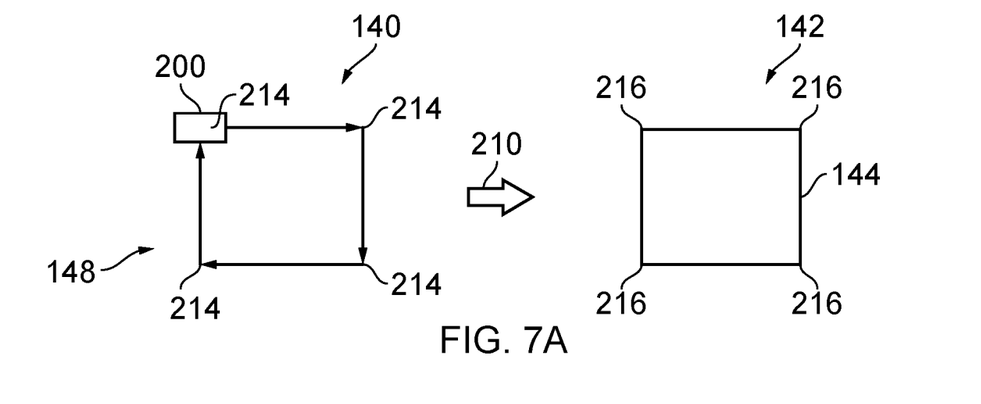
FIGS. 7A-7C illustrate computer-implemented virtual boundary definition/redefinition using movable craft.

In FIG. 7A, a computer-implemented virtual boundary 144 is defined 210 by a maneuver 148 comprising only movement of a single movable craft 200 in the monitored scene space 140. The computer-implemented virtual boundary 144 is defined 210 by the sequence of positions 214 of the single movable craft 200 in the monitored scene space 140. The movable craft 200 in the monitored scene space 140 specifies a sequence of points 214 in the monitored scene space 140 which correspond to points 216 in the monitoring space 143. The shape and position of the computer-implemented virtual boundary 144 is defined by the position of the points 216 in the monitoring space 142. In this example, the computer-implemented virtual boundary 144 is an N-sided polygon having N vertices (angular points) at the points 216. The single movable craft 200 in the monitored scene space 140 defines, at each position 214, one of the N vertices. The movable craft 200 may transmit a waypoint signal to identify to the system 100 that a waypoint on its journey specifies a point 214.

As illustrated in FIG. 7A, the maneuver 148 in a monitored scene space 140 defines points $p_1(t_1)$, $p_1(t_2)$, $p_1(t_3)$, $p_1(t_4)$ in the monitored scene space 140. The points $p_1(t_1)$, $p_1(t_2)$, $p_1(t_3)$, $p_1(t_4)$ in the monitored scene space 140 determine 210 corresponding points $p_1'(t_1)$, $p_1'(t_2)$, $p_1'(t_3)$, $p_1'(t_4)$ 216 in the monitoring space 142. Thus, the maneuver 148 in the monitored scene space 140 specifies the points $p_1'(t_1)$, $p_1'(t_2)$, $p_1'(t_3)$, $p_4'(t_4)$ in the monitoring space 142, which define the computer-implemented virtual boundary 144.

Figure 7B:
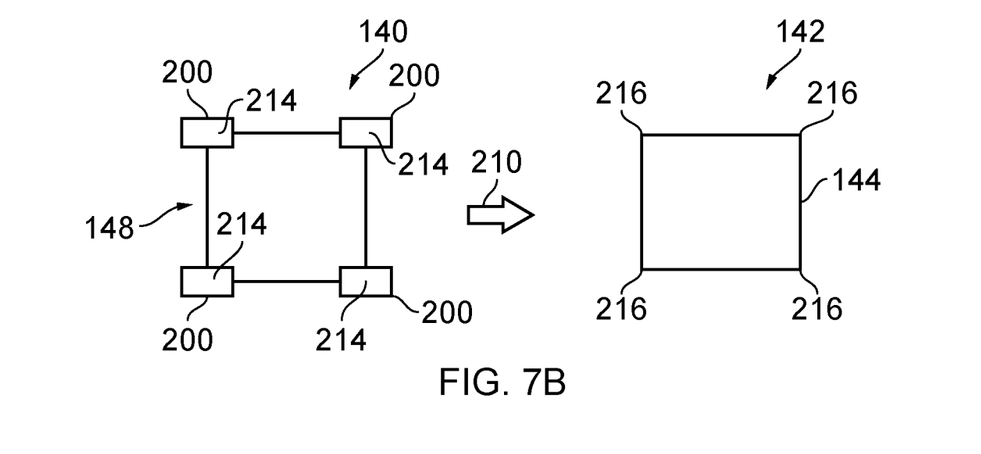

In FIG. 7B, a computer-implemented virtual boundary 144 is defined by a maneuver 148 comprising simultaneous positioning of multiple movable craft 200 in the monitored scene space 140. The computer-implemented virtual boundary 144 is defined 210 by the simultaneous positions 214 of the multiple movable craft 200 in the monitored scene space 140. The movable crafts 200 in the monitored scene space 140 specify an arrangement of points 214 in the monitored scene space 140 which corresponds to an arrangement of points 216 in the monitoring space 142. The shape and position of the computer-implemented virtual boundary 144 is defined by the position of the points 216 in the monitoring space 142. In this example, the computer-implemented virtual boundary 144 is an N-sided polygon having N vertices (angular points) at the points 216. Each of the different movable craft 200 in the monitored scene space 140 defines one of the N vertices. A movable craft 200 may transmit a waypoint signal to identify to the system 100 that a waypoint at this time on its journey specifies a point 214 or that the waypoints of the multiple movable craft 200 at this time on their journey specify the points 214.

As illustrated in FIG. 7B, the maneuver 148 in a monitored scene space 140 defines points $p_1(t_1)$, $p_2(t_1)$, $p_3(t_1)$, $p_4(t_1)$ in the monitored scene space 140. As illustrated in FIG. 7B, the points $p_1(t_1)$, $p_2(t_1)$, $p_3(t_1)$, $p_4(t_1)$ in the monitored scene space 140 determine corresponding points $p_1'$ $(t_1)$, $p_2'(t_1)$, $p_3'(t_1)$, $p_4'(t_1)$ in the monitoring space 142. Thus, the maneuver 148 in the monitored scene space 140 specifies the points $p_1'(t_1)$, $p_2'(t_1)$, $p_3'(t_1)$, $p_4'(t_1)$ in the monitoring space 142, which define the computer-implemented virtual boundary 144.

In another example (not separately illustrated), a computer-implemented virtual boundary 144 is defined by a maneuver 148 comprising simultaneous positioning of a first set of one or more movable craft 200 in the monitored scene space 140 (as in FIG. 7B) and, in addition, movement of a second set of one or more movable craft 200 in the monitored scene space 140 (as in FIG. 7A). The computer-implemented virtual boundary 144 is defined 210, in part, by the simultaneous positions 214 of the first set of multiple movable craft 200 and, in part, by the sequence of positions 214 of the second set of movable craft 200 in the monitored scene space 140. The first set of movable craft 200 in the monitored scene space 140 specify an arrangement of a first set of points 214 in the monitored scene space 140 which corresponds to an arrangement of points 216 in the monitoring space 142. The shape and position of a first part or first parts of the computer-implemented virtual boundary 144 is defined by the position of the first set of points 216 in the monitoring space 142. The second set of movable craft 200 in the monitored scene space 140 specifies one or more sequences of points 214 in the monitored scene space 140 which correspond to a second set of points 216 in the monitoring space 143. The shape and position of a second part or second parts of the computer-implemented virtual boundary 144 is defined by the position of the second set of points 216 in the monitoring space 142. In some examples, the computer-implemented virtual boundary 144 is an N-sided polygon having N vertices (angular points) at the first and second set of points 216. The movable craft 200 may transmit waypoint signals to identify to the system 100 that a waypoint at this time on its journey specifies a point 214.

Figure 7C:
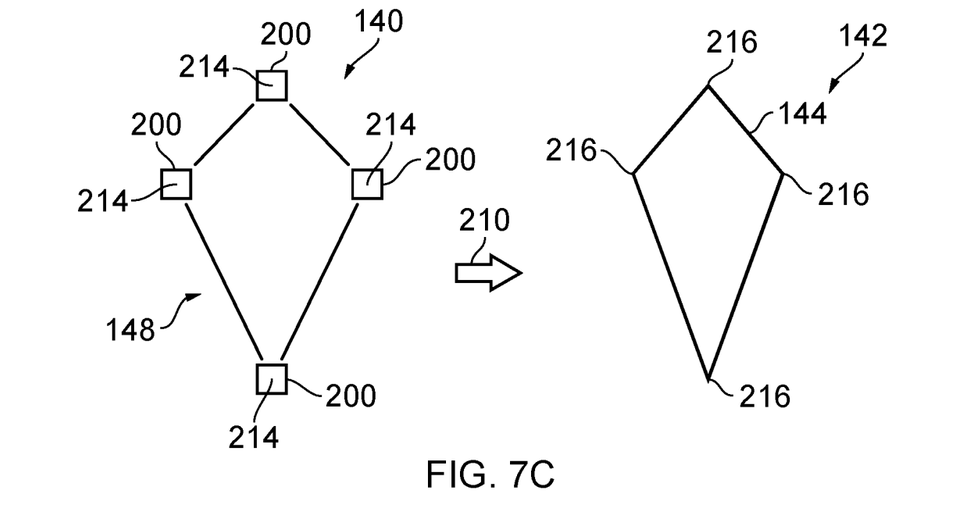

Dynamic modification of the computer-implemented virtual boundary 144 is possible. In FIG. 7C, the computer-implemented virtual boundary 144 as defined in FIG. 7B is redefined by a new maneuver 148 comprising re-positioning of one or more movable craft 200 in the monitored scene space 140. The computer-implemented virtual boundary 144 is redefined 210 by the new positions 214 of the multiple movable craft 200 in the monitored scene space 140. The movable crafts 200 in the monitored scene space 140 specify a new arrangement of points 214 in the monitored scene space 140 which corresponds to a new arrangement of points 216 in the monitoring space 142. The new shape and position of the computer-implemented virtual boundary 144 is defined by the new positions of the points 216 in the monitoring space 142. In this example, the computer-implemented virtual boundary 144 is an N-sided polygon having N vertices (angular points) at the points 216. Each of the different movable craft 200 in the monitored scene space 140 redefines one of the N vertices. A movable craft 200 may transmit a waypoint signal to identify to the system 100 that a waypoint at this time on its journey specifies a point 214 or that the waypoints of the multiple movable craft 200 at this time on their journey specify the points 214.

As illustrated in FIG. 7C, the maneuver 148 in a monitored scene space 140 defines points $p_1(t_2)$, $p_2(t_2)$, $p_3(t_2)$, $p_4(t_2)$ in the monitored scene space 140. As illustrated in FIG. 7C, the points $p_1(t_2)$, $p_2(t_2)$, $p_3(t_2)$, $p_4(t_2)$ in the monitored scene space 140 determine corresponding points $p_1'(t_2)$, $p_2'(t_2)$, $p_3'(t_2)$, $p_4'(t_2)$ in the monitoring space 142. Thus, the maneuver 148 in the monitored scene space 140 specifies the points $p_1'(t_2)$, $p_2'(t_2)$, $p_3'(t_2)$, $p_4'(t_2)$ in the monitoring space 142, which redefine the computer-implemented virtual boundary 144.

The maneuver 148, for example as described with reference to FIGS. 7A, 7B, 7C, may be autonomous, semi-autonomous or user controlled.

For example, a user may specify a size of the computer-implemented virtual boundary 144. The user may define a fixed size. The user may define rules that control re-sizing of the computer-implemented virtual boundary 144 autonomously.

For example, a user may specify a shape of the computer-implemented virtual boundary 144. The user may define a fixed shape. The user may define rules that control re-sizing of the computer-implemented virtual boundary 144 autonomously. This may, for example, occur when more or less movable craft 200 are available for use.

For example, a user may specify a position of the computer-implemented virtual boundary 144. The user may define a fixed absolute position or a fixed relative position relative to a user-specified tracked object. The user may define rules that control re-positioning of the computer-implemented virtual boundary 144 autonomously. This may, for example, occur when a tracked object or objects change position or when other contextual factors change such as a position of the sun.

The user control provided to enable user specification of a feature of a computer-implemented virtual boundary 144 or a rule that controls a feature of a computer-implemented virtual boundary 144, may be by any suitable means. For example, the user may be able to provide user input commands to the multiple movable craft 200, via the system 100 using for example gesture control, a touch screen interface, a programming interface, voice commands or similar.

Figure 8A:
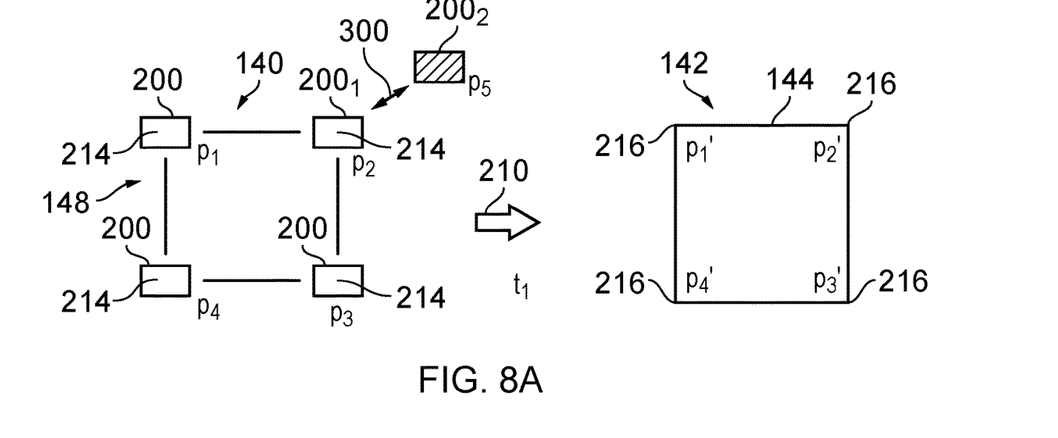
FIGS. 8A-8C illustrate computer-implemented virtual boundary definition using handover between movable crafts.
Figure 8B:
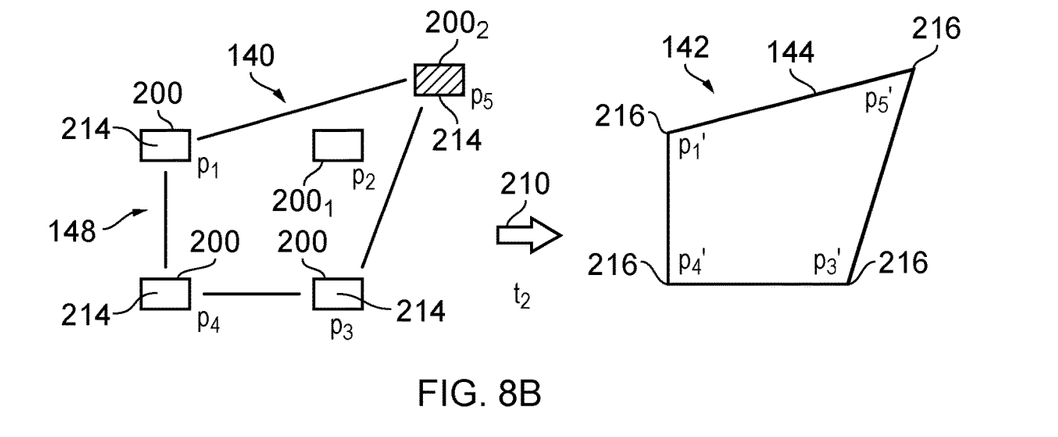
Figure 8C:
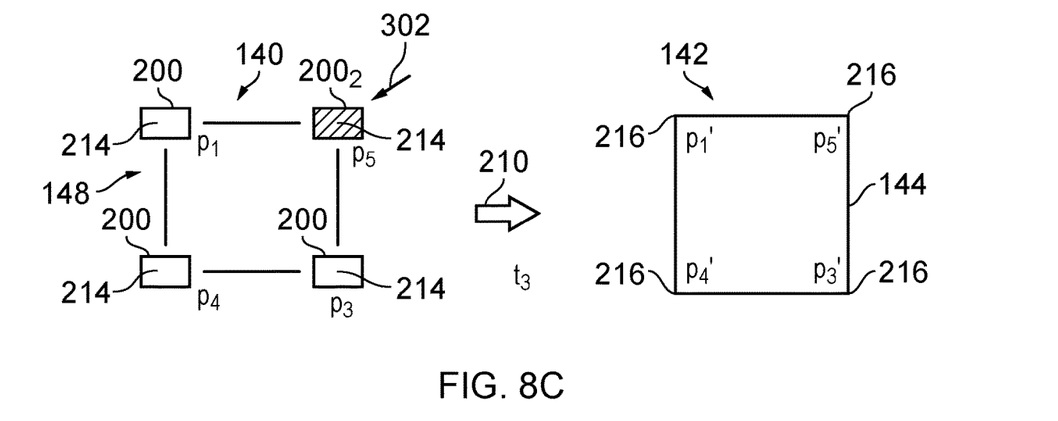

FIGS. 8A, 8B and 8C illustrate a handover procedure from a first movable craft $200_1$ to a second movable craft $200_2$. Before the handover, the first movable craft $200_1$ is used to define a computer-implemented virtual boundary 144. After the handover, the first movable craft $200_1$ is no longer used to define the computer-implemented virtual boundary 144 and the second movable craft $200_2$ is used to define the computer-implemented virtual boundary 144.

In these figures, a computer-implemented virtual boundary 144 is defined by a maneuver 148 comprising simultaneous positioning of multiple movable craft 200 in the monitored scene space 140. The computer-implemented virtual boundary 144 is defined 210 by the simultaneous positions 214 of the multiple movable craft 200 in the monitored scene space 140. The movable crafts 200 in the monitored scene space 140 specify an arrangement of points 214 in the monitored scene space 140 which corresponds to an arrangement of points 216 in the monitoring space 142. The shape and position of the computer-implemented virtual boundary 144 is defined by the position of the points 216 in the monitoring space 142. In this example, the computer-implemented virtual boundary 144 is an N-sided polygon having N vertices (angular points) at the points 216. Each of the different movable craft 200 in the monitored scene space 140 defines one of the N vertices. A movable craft 200 may transmit a waypoint signal to identify to the system 100 that a waypoint at this time on its journey specifies a point 214 or that the waypoints of the multiple movable craft 200 at this time on their journey specify the points 214.

The maneuver 148 in a monitored scene space 140 defines points $p_1(t_1)$, $p_2(t_1)$, $p_3(t_1)$, $p_4(t_1)$ in the monitored scene space 140.

As illustrated in FIG. 8A, before handover 300, the points $p_1(t_1)$, $p_2(t_1)$, $p_3(t_1)$, $p_4(t_1)$ in the monitored scene space 140 determine corresponding points $p_1'(t_1)$, $p_2'(t_1)$, $p_3'(t_1)$, $p_4'(t_1)$ in the monitoring space 142, which define the computer-implemented virtual boundary 144. The first movable craft $200_1$ is associated with position $p_2(t_1)$ and defines at least part of the computer-implemented virtual boundary 144. The second movable craft $200_2$ is associated with position $p_5(t_1)$ and does not define any part of the computer-implemented virtual boundary 144.

As illustrated in FIG. 8B, after handover 300, the points $p_1(t_2)$, $p_5(t_2)$, $p_3(t_2)$, $p_4(t_2)$ in the monitored scene space 140 determine corresponding points $p_1'(t_2)$, $p_5'(t_2)$, $p_3'(t_2)$, $p_4'(t_2)$ in the monitoring space 142, which define the computer-implemented virtual boundary 144. The first movable craft $200_1$, associated with position $p_2(t_1)$, no longer defines any part of the computer-implemented virtual boundary 144. The second movable craft $200_2$, associated with position $p_5(t_2)$, defines part of the computer-implemented virtual boundary 144.

In the example illustrated in FIG. 8C, but not necessarily all examples, next after handover 300, the second movable craft $200_2$, associated with position $p_5(t)$, changes position 302 so that its position $p_5(t_3)=p_2(t_1)$. That it, the second movable craft $200_2$ occupies the same position 214 as the first movable craft $200_1$ did before handover. 300. The points $p_1(t_3)$, $p_5(t_3)$, $p_3(t_3)$, $p_4(t_3)$ in the monitored scene space 140 determine corresponding points $p_1'(t_3)$, $p_5'(t_3)$, $p_3'(t_3)$, $p_4'(t_3)$ in the monitoring space 142, which define the computer-implemented virtual boundary 144. The computer-implemented virtual boundary 144 at time $t_3$ is the same as the computer-implemented virtual boundary 144 at time $t_1$, however, it is now defined by the second movable craft $200_2$ and not by the first movable craft $200_1$.

The handover 300 between movable craft 200 may be automatic. For example, if a battery used by the first movable craft $200_1$ discharges below a threshold level, it may transmit a replacement signal. The second movable craft $200_2$ in response to the replacement signal approaches the first movable craft $200_1$ and performs a handover 300 with the first movable craft $200_1$.

The handover 300 may additional involve the system 100 so that communications from the system 100 to the first movable craft $200_1$ change to communications from the system 100 to the second movable craft $200_2$. It may, for example, be necessary for the system 100 to de-pair with the first movable craft $200_1$ and pair with the second movable craft $200_2$.

Thus, the system 100 at time $t_1$, positions the first movable craft $200_1$ in the monitored scene space 140 to at least partially define a shape and position of a computer-implemented virtual boundary 144 in a corresponding monitoring space 142 and causes implementation of the computer-implemented virtual boundary 144 in the monitoring space 142 corresponding to the monitored scene space 140. The system 100 processes received data 112 from sensors 110 of the monitored scene space 140 to enable generation of a response event in response to a change in at least a portion of the monitored scene space 140 relative to the computer-implemented virtual boundary 144 in the corresponding monitoring space 142.

The system 100 between time $t_1$ and time $t_2$, recognizes a handover 300 from the first movable craft $200_1$ to a second movable craft $200_2$.

The system 100 at time $t_2$, positions the second movable craft $200_2$ in the monitored scene space 140 to at least partially define a new computer-implemented virtual boundary 144 in the corresponding monitoring space 142; and processes received data 112 from sensors 110 of the monitored scene space 140 to enable generation of a response event in response to a change in at least a portion of the monitored scene space 140 relative to the new computer-implemented virtual boundary 144 in the corresponding monitoring space 142.

In the above example a handover 300 is used to replace one movable craft 200 with another. In other examples one or more movable craft may be added increasing N or removed decreasing N.

In other examples one or more different computer-implemented boundaries may be combined to define a new computer-implemented boundary 214.

The system 100 may provide feedback to a user to confirm that the system 100 has recognized a maneuver 146 and has implemented computer-implemented boundary 144. The feedback may comprise any suitable feedback, for example audio and/or visual and/or tactile feedback and so on. Additionally or alternatively the system 100 may send one or more messages to a device or devices to inform the user that the system 100 has implemented computer-implemented boundary 144.

The system 100, may process received data to generate a response event when there is, relative to the at least one virtual boundary 144, a change in a portion of the monitored scene space 140 that causes a change in a portion of the monitoring space 142 demarcated by computer-implemented boundary.

For example, the system 100 may process data received by the sensors 110, such as audio and/or image data, to generate the response event. The system may analyze one or more audio and/or video feeds to generate the response event. In some examples processing the received data to generate the response event may be considered monitoring computer-implemented boundary 144.

In examples the same sensor, such as a camera, may be used in recognition of the maneuver 146 defining the at least one virtual boundary 144 and for monitoring the at least one virtual boundary 144.

In some examples, processing received data to generate the response event may comprise processing received data to monitor computer-implemented boundary 144 to detect activity across computer-implemented boundary 144 and/or activity within a threshold of computer-implemented boundary 144. For example, the system 100 may process audio and/or image and/or depth data to monitor computer-implemented boundary 144 to detect activity across computer-implemented boundary 144 or within a threshold of computer-implemented boundary 144.

The response event may comprise providing feedback, for example using the communication module 130. In some examples the feedback may comprise one or more alerts. The one or more alerts may comprise any form of alert such as audio and/or visual alerts. Additionally or alternatively, the feedback may comprise providing one or more messages to an apparatus such as a mobile telephone, tablet, laptop computer, desktop computer and so on.

In some examples, the response event may additionally or alternatively comprise incrementing a counter. For example, the system 100 may monitor the number of times there is a boundary interaction such as an object 152 touching and/or crossing and/or approaching within a threshold of computer-implemented boundary 144. In addition or alternatively the system 100 may monitor the direction of boundary interactions, such as the direction of boundary crossings. The system 100 may be configured to provide statistics on boundary interactions.

A user of the system 100, may configure the response event.

The system 100, in some examples, may process received data to generate a response event when there is, relative to computer-implemented boundary 144, a change in a portion of the monitored scene space 140 in relation to any object 152. For example, the system may generate a response event when any object 152 crosses, touches and/or comes within a threshold of computer-implemented boundary 144. Such virtual boundaries 144 may be considered general virtual boundaries 144.

In other examples, the system may process received data to generate a response event when there is, relative to computer-implemented boundary 144, a change in a portion of the monitored scene space 140 in relation to one or more user specified objects 152.

For example, after defining the computer-implemented virtual boundary 144, a user of the system 100 may indicate to the system 100 one or more objects 152. The system 100 in response the system 100 may generate a response event only when there is a change in a portion of the monitored scene space 140, relative to computer-implemented boundary 144, in relation to the indicated objects 152. For example, the system 100 may generate a response event only when one of the indicated objects 152 crosses, touches and/or comes within a threshold of computer-implemented boundary 144. Such virtual boundaries 144 may be considered object specific virtual boundaries.

In some examples a computer-implemented virtual boundary 144 may be conditionally monitored and/or conditionally enabled/disabled. For example, the system 100 may process received data to generate a response event when there is, relative to the computer-implemented virtual boundary 144, a change in a portion of the monitored scene space 140 when one or more criteria are satisfied but does not process received data to generate the response event otherwise.

The criteria may be predefined and/or may be configured by a user.

In examples any criterion/criteria may be used. For example, any temporal and/or physical criteria may be used. In examples, a computer-implemented virtual boundary 144 may be conditionally monitored dependent upon time of day and/or day of week and/or week of month and/or month of year and/or independence upon the presence of one or more objects 152 in the monitored scene space 140.

FIG. 9 illustrates an example of a method 800. The method 800 may be performed by the system 100. At block 802, the method 800 comprises: positioning one or more movable craft 200 in a monitored scene space 140 to at least partially define a shape and position of a computer-implemented virtual boundary 144 in a corresponding monitoring space 142. At block 804, the method 800 comprises: causing implementation of the computer-implemented virtual boundary 144 in the monitoring space 142 corresponding to the monitored scene space 140. At block 806, the method 800 comprises: processing received data 112 from sensors 110 of the monitored scene space 140 to generate a response event in response to a change in at least a portion of the monitored scene space 140 relative to the computer-implemented virtual boundary 144 in the corresponding monitoring space 142.

Where a structural feature has been described, it may be replaced by means for performing one or more of the functions of the structural feature whether that function or those functions are explicitly or implicitly described.

Examples of the disclosure provide for an easy and intuitive way to define virtual boundaries for a surveillance system.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not. Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising at least one processor and at least one non-transitory memory, the at least one memory comprising machine-readable instructions that, when executed, cause the apparatus to:
    determine one or more positions of one or more movable drones in a monitored scene space;
    implement a computer-implemented virtual boundary in a monitoring space corresponding to the monitored scene space, wherein a shape and position of the computer-implemented virtual boundary is at least partially defined by the one or more determined positions;
    process received data from sensors of the monitored scene space to generate a response event in response to a change in at least a portion of the monitored scene space relative to the computer-implemented virtual boundary in the corresponding monitoring space;
    encode the response event in terms of one or more parameters determined from an analysis of the change in the at least a portion of the monitored scene space;
    recognize the one or more parameter encoding to identify the response event; and
    provide feedback to a user based on the generation of the response event and the identification of the response event.

2. The apparatus of claim 1, wherein at least one of the one or more movable drones is an aircraft drone configured to autonomously maintain a three dimensional position and/or configured to autonomously maintain a three dimensional orientation.

3. The apparatus of claim 1, wherein the one or more movable drones in the monitored scene space specifies points in the monitored scene space which correspond to points in the monitoring space, wherein the shape and position of the computer-implemented virtual boundary is at least partially defined by the points in the monitoring space.

4. The apparatus of claim 1, wherein the computer-implemented virtual boundary is an N-sided polygon having N vertices, wherein the one or more movable drones in the monitored scene space define the N vertices.

5. The apparatus of claim 1, wherein the computer-implemented virtual boundary is defined by movement of only a single drone in the monitored scene space.

6. The apparatus of claim 1, wherein the computer-implemented virtual boundary is defined by positions of multiple drones in the monitored scene space.

7. The apparatus of claim 1, wherein determining the one or more positions comprises processing the received data to track motion of the one or more movable drones in the monitored scene space.

8. The apparatus of claim 1, wherein the machine-readable instructions, when executed, further cause the apparatus to:
    pair wirelessly with the one or more movable drones in the monitored scene space to enable determination of the one or more positions of the one or more movable drones in the monitored scene space and definition of the shape and position of the computer-implemented virtual boundary;
    wherein the pairing comprises an authentication procedure that identifies the one or more movable drones and/or an authorization procedure that checks one or more security credentials.

9. The apparatus of claim 1, wherein the machine-readable instructions, when executed, further cause the apparatus to:
    recognize at least one predetermined waypoint signal to allow a vertex in the computer-implemented virtual boundary to be recognized.

10. The apparatus of claim 1, wherein at least some of the sensors of the monitored scene space are part of the one or more movable drones.

11. The apparatus of claim 1, wherein processing the received data to generate the response event comprises processing image data to monitor the computer-implemented virtual boundary to detect activity across the computer-implemented virtual boundary and/or activity within a threshold of the computer-implemented virtual boundary.

12. The apparatus of claim 1, wherein the machine-readable instructions, when executed, further cause the apparatus to:
    recognize a handover from a first drone to a second drone;

position the second drone in the monitored scene space to at least partially define a new computer-implemented virtual boundary in the corresponding monitoring space; and process second received data from second sensors of the monitored scene space to enable generation of a second response event in response to a second change in at least a second portion of the monitored scene space relative to the new computer-implemented virtual boundary in the corresponding monitoring space.

13. The apparatus of claim 1, wherein the machine-readable instructions, when executed, further cause the apparatus to update the virtual boundary in response to a maneuver of the one or more movable drones and a determined corresponding new position of the one or more movable drones.

14. The apparatus of claim 1, wherein at least one of the sensors is fixed relative to the scene space in a spatially distributed arrangement.

15. The apparatus of claim 1, wherein the response event is further generated in response to one or more user criteria being satisfied.

16. The apparatus of claim 1, wherein the recognizing of the one or more parameter encoding to identify the response event is performed using a machine inference engine trained via supervised learning.

17. The apparatus of claim 1, wherein the processing of the sensor data comprises a temporary recording of the sensor data at a dynamic memory or buffer.

18. A method comprising:
determining one or more positions of one or more movable drones in a monitored scene space;
causing implementation of a computer-implemented virtual boundary in a monitoring space corresponding to the monitored scene space, wherein a shape and position of the computer-implemented virtual boundary is at least partially defined by the one or more determined positions;
processing received data from sensors of the monitored scene space to generate a response event in response to a change in at least a portion of the monitored scene space relative to the computer-implemented virtual boundary in the corresponding monitoring space;
encoding the response event in terms of one or more parameters determined from an analysis of the change in the at least a portion of the monitored scene space;
recognizing the one or more parameter encoding to identify the response event; and
providing feedback to a user based on the generation of the response event and the identification of the response event.

19. A method as claimed in claim 18, wherein at least one of the one or more movable drones is an aircraft drone configured to autonomously maintain a three dimensional position and/or configured to autonomously maintain a three dimensional orientation.

20. A method as claimed in claim 18, wherein the one or more movable drones in the monitored scene space specifies points in the monitored scene space which correspond to points in the monitoring space, wherein the shape and position of the computer-implemented virtual boundary is at least partially defined by the points in the monitoring space.

21. A method as claimed in claim 18, wherein the computer-implemented virtual boundary is an N-sided polygon having N vertices, wherein the one or more movable drones in the monitored scene space define the N vertices.

22. A method as claimed in claim 18, wherein determining the one or more positions comprises processing the received data to track motion of the one or more movable drones in the monitored scene space.

23. A method as claimed in claim 18, further comprising pairing wirelessly with the one or more movable drones in the monitored scene space to enable determination of the one or more positions of the one or more movable drones in the monitored scene space and definition of the shape and position of the computer-implemented virtual boundary, wherein the pairing comprises an authentication procedure that identifies the one or more movable drones and/or an authorization procedure that checks one or more security credential.

24. A method as claimed in claim 18, further comprising recognizing at least one predetermined waypoint signal to allow a vertex in the computer-implemented virtual boundary to be recognized.

25. At least one non-transitory computer readable medium comprising instructions that, when executed, perform:
determining one or more positions of one or more movable drones in a monitored scene space;
implementing a computer-implemented virtual boundary in a monitoring space corresponding to the monitored scene space, wherein a shape and position of the computer-implemented virtual boundary is at least partially defined by the one or more determined positions;
processing received data from sensors of the monitored scene space to generate a response event in response to a change in at least a portion of the monitored scene space relative to the computer-implemented virtual boundary in the corresponding monitoring space;
encoding the response event in terms of one or more parameters determined from an analysis of the change in the at least a portion of the monitored scene space;
recognizing the one or more parameter encoding to identify the response event; and
providing feedback to a user based on the generation of the response event and the identification of the response event.

* * * * *